United States Patent
Ciccone

(10) Patent No.: US 9,469,354 B1
(45) Date of Patent: Oct. 18, 2016

(54) AIRFOIL WITH ADJUSTABLE TAIL FLAP

(71) Applicant: Ford Global Technologies, LLC, Dearborn, MI (US)

(72) Inventor: Thomas Joseph Ciccone, Madison Heights, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 14/753,218

(22) Filed: Jun. 29, 2015

(51) Int. Cl.
*B62D 35/00* (2006.01)
*B62D 35/02* (2006.01)
*G05D 3/00* (2006.01)

(52) U.S. Cl.
CPC ............ *B62D 35/005* (2013.01); *B62D 35/02* (2013.01); *G05D 3/00* (2013.01)

(58) Field of Classification Search
CPC .... B62D 35/00; B62D 35/005; B62D 35/02; B62D 37/02; B60R 19/48
USPC .......................................... 296/180.1–180.5
See application file for complete search history.

(56) References Cited

U.S. PATENT DOCUMENTS

| | | | | |
|---|---|---|---|---|
| 3,791,468 A | * | 2/1974 | Bryan, Jr. | B62D 37/02 105/1.3 |
| 4,379,582 A | * | 4/1983 | Miwa | B62D 35/005 293/113 |
| 4,758,037 A | * | 7/1988 | Suzuki | B62D 35/005 296/180.1 |
| 4,810,022 A | | 3/1989 | Takagi et al. | |
| 5,056,860 A | * | 10/1991 | Cornacchia | B62D 15/02 280/762 |
| 5,184,832 A | * | 2/1993 | Miwa | B62D 35/005 280/848 |
| 5,419,608 A | * | 5/1995 | Takemoto | B60G 3/00 180/903 |
| 6,070,933 A | * | 6/2000 | Tsukidate | B62D 35/005 180/68.1 |
| 6,286,893 B1 | * | 9/2001 | Presley | B62D 35/005 296/180.5 |
| 7,661,753 B2 | | 2/2010 | Shinedling et al. | |
| 8,186,746 B2 | | 5/2012 | Mackenzie et al. | |
| 8,210,600 B1 | * | 7/2012 | Verhee | B62D 35/005 296/180.1 |
| 8,926,000 B2 | | 1/2015 | del Gaizo et al. | |
| 2002/0093220 A1 | * | 7/2002 | Borghi | B62D 35/005 296/180.5 |
| 2009/0085371 A1 | * | 4/2009 | Nagahama | B62D 37/02 296/180.5 |
| 2011/0163570 A1 | * | 7/2011 | Takeuchi | B62D 35/02 296/181.5 |
| 2012/0024611 A1 | * | 2/2012 | Ajisaka | B60K 11/08 180/68.1 |
| 2013/0238198 A1 | * | 9/2013 | Prentice | B62D 35/02 701/49 |
| 2013/0257093 A1 | * | 10/2013 | del Gaizo | B62D 35/02 296/180.5 |
| 2014/0075064 A1 | * | 3/2014 | Minegishi | G06F 13/4022 710/69 |
| 2014/0346809 A1 | | 11/2014 | Lee et al. | |
| 2015/0232138 A1 | * | 8/2015 | Parry-Williams | B62D 35/02 296/180.5 |
| 2015/0239511 A1 | * | 8/2015 | Reuvekamp | B62D 35/005 296/180.1 |
| 2015/0300434 A1 | * | 10/2015 | Morales Perez | F16D 65/847 188/264 A |
| 2015/0353149 A1 | * | 12/2015 | Wolf | B62D 35/007 296/180.5 |

FOREIGN PATENT DOCUMENTS

| | | | | |
|---|---|---|---|---|
| JP | 2-241883 | * | 9/1990 | ............ B62D 37/02 |
| JP | 2006-175888 | * | 7/2006 | ............ B62D 37/02 |
| WO | 2010030158 A1 | | 3/2010 | |

* cited by examiner

*Primary Examiner* — Gregory Blankenship
(74) *Attorney, Agent, or Firm* — Jason Rogers; Brooks Kushman, P.C.

(57) ABSTRACT

An adjustable airfoil assembly attached to a front fascia of a vehicle. The airfoil assembly includes an airfoil wing and a flap pivotally connected to the airfoil wing. An actuator is operatively attached to the flap to selectively pivot the flap upwardly and downwardly to adjust downforce applied by the airfoil assembly to the front end of the vehicle. The wing is a fiber reinforced polymeric member fixedly attached to the front fascia by a plurality of posts connected to the front fascia. The flap has a top surface extending from the flat top surface of the wing to a rear edge of the flap and a base surface extending from the convex bottom surface to the rear edge of the flap.

16 Claims, 2 Drawing Sheets

AIRFOIL WITH ADJUSTABLE TAIL FLAP

TECHNICAL FIELD

This disclosure relates to airfoils for vehicles that provide an adjustable level of downforce and drag.

BACKGROUND

Air flow is an important factor for vehicle performance and efficiency. Vehicle performance can be improved by increasing the level of downforce in a turn or minimizing downforce in a straightaway. Vehicle efficiency can be improved by reducing drag, or wind resistance, and minimizing downforce except for when the vehicle is turning.

Active rear spoilers are known to be pivoted to adjust air flow over the rear deck lid of a vehicle. However, rear spoilers do not substantially affect the downforce applied to front wheels when turning. Rear spoilers are normally one-piece structures that are adjusted by pivoting the one-piece structure about a transverse axis.

This disclosure is directed to the above problems and other problems as summarized below.

SUMMARY

According to one aspect of this disclosure, an airfoil assembly is provided for a front fascia of a vehicle that comprises a wing shaped member and a pivotal flap. The wing shaped member is attached to the fascia and extends transversely across the fascia. The flap is attached to a rear portion of the wing shaped member by a pivot connector. A linkage is operatively attached to the flap and an actuator is connected to the flap through the linkage for pivoting the flap by moving a rear edge of the flap vertically.

According to other aspects of this disclosure, the wing shaped member may be fixedly attached to the fascia and may have a relatively flat top surface and a convex bottom surface that form an airfoil. The wing shaped member may be made from a fiber reinforced polymeric material, such as fiber glass or carbon fiber filled polymer composite. The flap may have a top surface extending from the top surface of the wing shaped member to a rear edge of the flap and a base surface extending from the convex bottom surface to the rear edge of the flap.

The linkage may further comprise a pinion gear operatively connected to the actuator and a rack gear connecting the pinion gear to the flap.

The pivot connector may be an elongated shaft that is received in an opening defined by and extending through the wing shaped member and the flap. The elongated shaft may be received in the first and second plurality of hinge pin receptacles.

The assembly may further comprise a plurality of posts connected to the wing shaped member and the front fascia that suspends the wing shaped member below the front fascia in a spaced relationship relative to the front fascia.

According to another aspect of this disclosure, a front fascia assembly of a vehicle is disclosed that comprises a fascia panel defining a plurality of air flow openings that is attached to the vehicle in front of an engine compartment and an airfoil assembly. The airfoil assembly includes a wing having a flap pivotally attached to a rear portion of the wing. A motor is attached to the fascia panel and the flap by a linkage that is operative to raise and lower a rear edge of the flap to change an aerodynamic effect of the airfoil assembly.

According to a further aspect of this disclosure, an adjustable airfoil assembly is provided that is adapted to be attached to a fascia of a vehicle. The adjustable airfoil assembly comprises an airfoil wing and a flap pivotally connected to the airfoil wing. An actuator is operatively attached to the flap to selectively pivot the flap upwardly and downwardly to adjust a downforce applied by the airfoil assembly to the vehicle.

According to other aspects of this disclosure as it relates to the adjustable airfoil assembly, the wing may be a fiber reinforced polymeric member fixedly attached to the fascia by a plurality of posts connected to the wing and a front fascia that suspend the wing below the front fascia in a spaced relationship relative to the front fascia. The wing may have a convex bottom surface and a relatively flat top surface that form an inverted airfoil. The wing may be fixedly attached to the vehicle and may have a convex bottom surface and a flat top surface that form an airfoil. The flap may have a top surface extending from the flat top surface of the wing to a rear edge of the flap and a base surface extending from the bottom convex surface to the rear edge of the flap.

The actuator may further comprise a motor, a pinion gear operatively connected to the motor and a rack gear connecting the pinion gear to the flap. A controller is provided that is operative to bi-directionally actuate the motor to raise and lower the flap.

The above aspects and other aspects of this disclosure are described below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
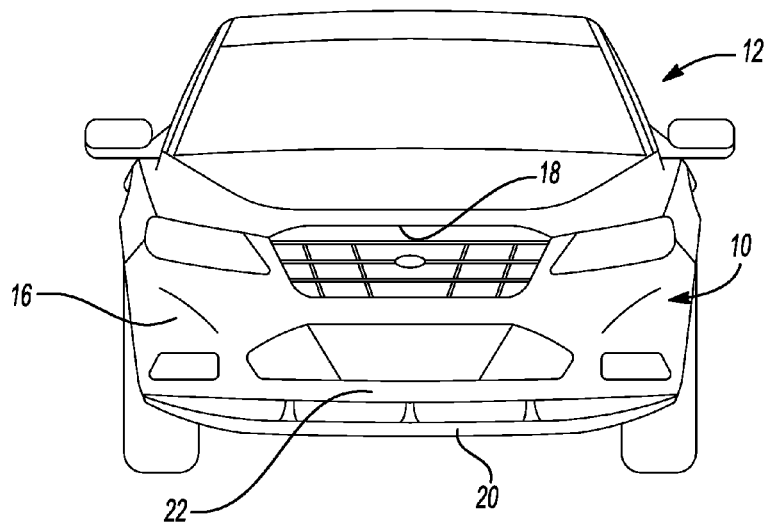
FIG. 1 is a front elevation view of a vehicle including a wing-shaped member made according to one aspect of this disclosure.

Referring to FIG. 1, a front end 10 of a vehicle 12 is illustrated that includes a front fascia assembly 16. The front fascia assembly 16 may also be referred to as a fascia panel. The front fascia assembly 16 defines a grille opening 18 that is aligned with the radiator and condenser (not shown). A wing-shaped member 20, or airfoil, is shown with a ground effect panel 22 portion of the front fascia assembly 16.

Figure 2:
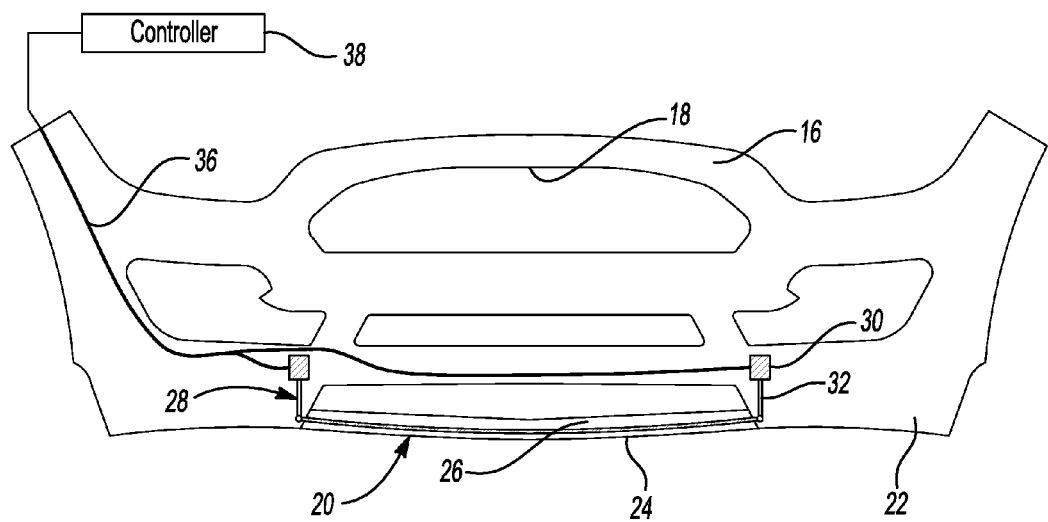
FIG. 2 is an internal elevation view of a front fascia assembly including a wing-shaped member made according to one aspect of this disclosure.

Referring to FIG. 2, the front fascia assembly 16 defining the grille opening 18 is shown from an inner point of view.

The wing-shaped member 20 is shown in the area of the ground effect panel 22. From the rear, it is possible to see a flap 24 that is attached to a rear portion 26 of the wing-shaped member 20. An actuator 28 is generally indicated by reference numeral 28 and includes a motor 30 and a linkage 32. The motor 30 and linkage 32 may be provided on both lateral ends of the flap 24. Alternatively, a single motor 30 and linkage 32 could be provided on only one side with the other side including a passive linkage. The motor 30 drives the linkage 32 to raise and lower the flap 24. Wiring 36 connects the motor 30 to a controller 38. The controller 38 may be a dedicated controller or may be incorporated in one or more multi-function controllers that are used to control other vehicle functions.

Figure 3:
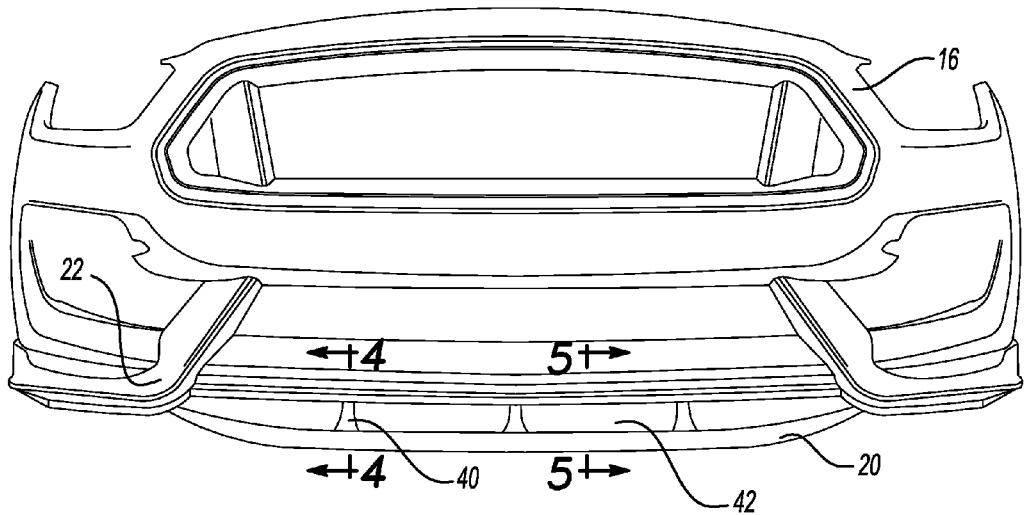
FIG. 3 is a front elevation view of a front fascia assembly including a wing-shaped member made according to one aspect of this disclosure.

Referring to FIG. 3, the front fascia assembly 16 including the ground effect panel 22, or ground effect portion, is illustrated with the inverted wing-shaped member 20, or airfoil. The wing-shaped member 20 is suspended from the front fascia assembly 16 by a plurality of posts 40. The posts 40 define a plurality of air flow openings 42 that allow air to flow over the top of the wing-shaped member 20.

Figure 4:
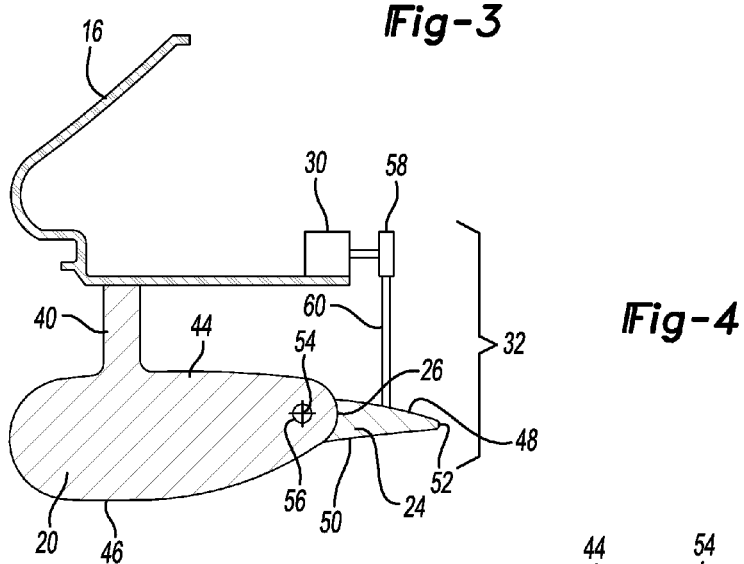
FIG. 4 is a cross-sectional view taken along the line 4-4 in FIG. 3.

Referring to FIG. 4, the front fascia assembly 16 is shown with the wing-shaped member 20 supported or suspended from the front fascia assembly 16 by one of the posts 40. The wing-shaped member 20 includes a convex bottom surface 44 and a relatively flat top surface 46. The convex bottom surface 44 forms an airfoil with the flat top surface 46. The top surface 46 may have some curvature, but the extent of curvature of the top surface 46 is substantially less than the curvature of the convex bottom surface 44 to provide an airfoil effect wherein air passing over the top and bottom of the wing-shaped member 20 creates a low pressure zone as a result of the convex bottom surface 44 that creates negative lift.

The flap 24 is attached to the rear portion 26 of the wing-shaped member 20. The flap 24 includes a top surface 48 and a base surface 50. The top surface 48 extends from the rear portion 26 of the wing-shaped member 20 to a rear edge 52. The base surface 50 of the flap 24 extends from the rear portion 26 of the bottom surface 44 of the wing-shaped member 20 to the rear edge 52. A pivot connector 54, or elongated shaft, is assembled in a hinge pin opening 56, or hinge pin receptacle, to moveably support the flap 24. The flap 24 is moved by the motor 30 and linkage 32, as previously described with reference to FIG. 2. The linkage 32 may include a pinion gear 58 and a rack gear 60. The pinion gear 58 is rotated by the motor 30 in a bi-directional manner to raise and lower the rear edge 52 of the flap 24, as will be described more particularly with reference to FIG. 5.

Figure 5:
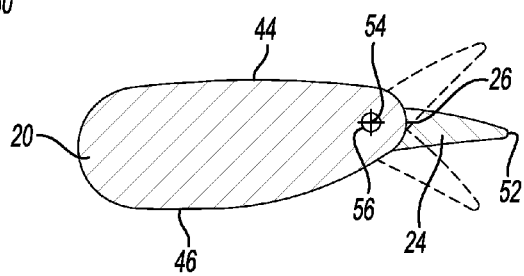
FIG. 5 is a cross-sectional view taken along the line 5-5 in FIG. 3.

Referring to FIG. 5, the wing-shaped member 20 is shown with its convex bottom surface 44 and relatively flat top surface 46. The convex bottom surface 44 and flat top surface 46 extend to the rear portion 26 of the flap 20. In the rear portion, the pivot connector 54 and opening 56 are shown supporting the flap 24 in a pivotal manner. The flap 24 is movable between the upper position shown in phantom lines in FIG. 4 to a lower position as shown in FIG. 5. When the flap 24 is moved to the upper position, increased downforce is provided by the wing-shaped member 20. The downforce, or negative lift, is created by the differential between air pressure flowing over the convex bottom surface 44 and the top surface 46. When the flap 24 is in the lower position shown in FIG. 5, the differential between the air pressure flowing over the convex bottom surface 44 and the flat top surface 46 is decreased and results in reduced downforce and less negative lift being provided by the wing-shaped member 20.

The front fascia assembly 16 is preferably an injection molded thermoplastic part that may include fiber reinforcements as appropriate. The wing-shaped member is preferably a polymeric member having fiber reinforcements for strengthening the wing-shaped member 20 and provides a more durable part.

While the actuator 28 in the specific embodiment disclosed above is a rack and pinion gear, it should be understood that the linkage 32 could be made up of articulated links, such as a four bar link, for moving the flap in an upward and downward direction. While the embodiment disclosed above includes a motor 30 that drives the linkage 32, it should be understood that a hydraulic or pneumatic cylinder may also be used to raise and lower the flap 24.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. An airfoil assembly for a vehicle comprising:
   an airfoil having a convex bottom and a relatively flat top, fixedly attached to and extending transversely across a front fascia;
   a flap attached to a rear portion of the airfoil by a pivot connector;
   a linkage operatively attached to the flap; and
   an actuator connected to the flap through the linkage for pivoting the flap by moving a rear edge of the flap vertically.

2. The assembly of claim 1 wherein the airfoil is a fiber reinforced polymeric member.

3. The assembly of claim 1 wherein the flap has a top surface extending from the flat top surface of the airfoil to a rear edge of the flap and a base surface extending from the convex bottom surface to the rear edge of the flap.

4. The assembly of claim 1 wherein the linkage further comprises:
   a pinion gear operatively connected to the actuator; and
   a rack gear connecting the pinion gear to the flap.

5. The assembly of claim 1 wherein the pivot connector is an elongated shaft that is received in an opening extending through the airfoil and the flap.

6. The assembly of claim 1 further comprising:
   a plurality of posts connected to the airfoil and the front fascia that suspend the wing shaped member below the front fascia in a spaced relationship relative to the front fascia.

7. A front fascia assembly of a vehicle comprising:
   a fascia panel defining a plurality of air flow openings that is attached to the vehicle in front of an engine compartment; and
   an airfoil assembly including a wing fixedly attached to the fascia panel and having a convex bottom surface and a relatively flat top surface that form an airfoil, the wing having a flap pivotally attached to a rear portion of the wing, a motor attached to the fascia panel and the flap by a linkage that is operative to raise and lower a rear edge of the flap to change an aerodynamic effect of the airfoil assembly.

8. The assembly of claim 7 wherein the wing is a fiber reinforced polymeric member.

9. The assembly of claim 7 wherein the flap has a top surface extending from the flat top surface of the wing to the rear edge of the flap and a base surface extending from the convex bottom surface to the rear edge of the flap.

10. The assembly of claim 7 wherein the linkage further comprises:
a pinion gear operatively connected to the motor; and
a rack gear connecting the pinion gear to the flap.

11. The assembly of claim 7 further comprising:
an elongated hinge pin; and
wherein the wing and the flap define a hinge pin opening, and wherein the elongated hinge pin is assembled into the hinge pin opening.

12. The assembly of claim 7 further comprising:
a plurality of posts connected to the wing and the fascia panel that suspend the wing below the fascia panel in a spaced relationship relative to the fascia panel.

13. An adjustable airfoil assembly attached to a fascia of a vehicle comprising:
an airfoil wing fixedly attached to the fascia and having a convex bottom surface and a relatively flat top surface that form an airfoil;
a flap pivotally connected to the airfoil wing; and
an actuator operatively attached to the flap to selectively pivot the flap upwardly and downwardly to adjust a downforce applied by the airfoil assembly to the vehicle.

14. The assembly of claim 13 wherein the wing is a fiber reinforced polymeric member attached by a plurality of posts connected to the wing that suspend the wing below the fascia in a spaced relationship relative to the fascia.

15. The assembly of claim 13 wherein the flap has a base surface extending from the convex bottom surface of the wing to a rear edge of the flap and a top surface extending from the top surface to the rear edge of the flap.

16. The assembly of claim 13 wherein the actuator further comprises:
a motor;
a pinion gear operatively connected to the motor;
a rack gear connecting the pinion gear to the flap; and
a controller operative to bi-directionally actuate the motor to raise and lower the flap.

* * * * *